United States Patent Office

3,154,531
Patented Oct. 27, 1964

3,154,531
EXTRACTION PROCESS USING BASIC ION EXCHANGE RESINS TO CONTROL PROTEIN SOLUBILITY
Kenkichi Yoshimura, Yokohama, Kanagawa-ken, Hiroshi Yamamoto, Tokyo, Kiyoharu Ouye, Tokyo, Saburo Ikawa, Yokohama, Kanagawa-ken, Shiro Terashima, Tokyo, and Taizi Matsumoto, Kawasaki-shi, Kanagawa-ken, Japan, assignors to Ajinomoto Kabushiki Kaisha, Tokyo, Japan, a corporation of Japan
Filed Sept. 1, 1960, Ser. No. 53,465
Claims priority, application Japan, Sept. 5, 1959, 34/28,513
1 Claim. (Cl. 260—123.5)

The present invention relates to processes for obtaining refined protein in a high yield by extracting deoiled seeds such as deoiled soybeans, peanuts, cotton seeds, kapok seeds, sunflower seeds, rape seeds, sesame seeds, etc. with water in the co-presence of an anion exchange resin thereby utilizing inorganic elements contained in the deoiled seeds to dissolve out effectively the protein from seeds, to refine the protein and to separate organic acids contained in the deoiled seeds.

An object of the present invention is to separate colorless, odorless and tasteless protein which contains little ash and which is suitable for use in various industries, particularly for food industries, and at the same time to separate organic acids contained in deoiled or oil extracted seeds in useful forms and to make the extraction residue suitable for use as an industrial material by very simple operations. For the separation of protein from deoiled seeds, it has been known to use an alkali solution for extraction. However, when this extraction is carried out, components other than protein are also dissolved out and it is very difficult to obtain vegetable protein of high purity by removing these other dissolved materials. Furthermore it increases unavoidably the loss of protein while producing substances other than protein, e.g., organic acids, and waste. The extraction residue still contain protein, but the ash content in the residue after extraction with alkali is higher than that of the original deoiled seeds, and it is necessarily less suitable as a material for production of amino acids.

The present invention contemplates a commercial process which eliminates all the difficulties above described and in which protein of very high purity in high yield from deoiled seeds is separated, while separating organic acids contained in the seeds in a useful form, and while providing an extraction residue which is useful as an industrial material.

In the following, the present invention will be explained in detail in respect of an embodiment wherein deoiled soybean is treated as the representative of deoiled seeds. However, it is to be understood that the process of the present invention is not limited to extraction from deoiled soybeans but is similarly applicable to extraction from various other deoiled seeds such as peanuts, cotton seeds, kapok seeds, sunflower seeds, rape seeds, sesame seeds and the like.

According to said embodiment, one part of deoiled soybeans was charged in an extraction vessel and was connected to a column containing 0.6–0.8 part of an anion exchange resin (OH type). 10 parts of water was circulated between the extraction vessel and the column to carry out extraction for 7–8 hours. After completion of extraction, the extraction residue was filtered off and the resin was washed with water and the washing water was combined with the extraction liquid. The extraction liquid was furnished with cation exchange resin (H type) and neutralized to pH 7.0 and contained cations were removed. After neutralization and removal salts, adequate acid (hydrochloric acid, sulfuric acid, citric acid, lactic acid, acetic acid and the like which can be usable for the preparation of beverage and food) was added to adjust the pH of the liquid to the isoelectric point of protein, that is, pH 4.0–4.5, a protein product of high purity was obtained in high yield by separating the coagulated protein in a centrifuge.

The extraction liquid obtained by extraction with water in co-presence of anion exchange resin may directly have acid added to adjust the pH of said extraction liquid to the isoelectric point of protein and coagulated protein may be separated in a centrifuge.

The anion exchange resin used for the extraction of protein from deoiled soybeans may be treated with caustic soda solution to dissolve the anion out and the effluent solution may be treated with cation exchange resin (H type) to remove sodium ion and be concentrated to separate organic acids therefrom. The anion exchange resin treated with caustic soda solution to dissolve out protein may be used again for extraction after washing it with water.

Deoiled seeds generally contain ash, the main ingredients of which are potassium and calcium. They are probably present in combined forms and consequently the pH of the extraction liquid obtained by extracting deoiled seeds with water is maintained substantially neutral However, when this extraction liquid is treated with anion exchange resin (OH type), out of the ash, organic acids or organic acid salts, water soluble protein, sugars and the like contained in said water extraction liquid, the organic acids are selectively adsorbed by the resin by exchange and potassium and calcium are separated free. Accordingly the pH of the extraction liquid is rapidly raised thereby to dissolve the protein contained in the deoiled seeds rapidly. The anion exchange resin adsorbs also coloring materials or pigments which may be dissolved out simultaneously. The amount of pigments adsorbed by the resin varies depending on the degree of cross linking of the resin, and porous resin of low degree of cross linking exhibits higher decoloring function.

According to the present invention, it is possible to dissolve out protein from deoiled seeds at a rate as high as in the case where alkali or alkali salt solution is used without using alkali or alkali salt solution. Further since contents other than protein such as organic acids and pigments are removed by the adsorption by resin in the course of the extraction process, the refining of the protein is simultaneously carried out in the course of extraction to give a protein of high purity.

For the anion exchange resin used in the present invention, any resin capable of adsorbing anions by decomposing neutral salts can be used, and particularly strongly basic anion exchange resins having quarternary ammonium salts as their functional groups, for example, Amberlite IRA–400, Amberlite IRA–410, Duolite A40, Duolite A42, Dowex 1, Dowex 2, Zeollex–SB, etc. are suitable.

Moderately basic or weakly basic anion exchange resins having tertiary, secondary and primary amines as functional groups, for example, Amberlite IR–45, Amberlite IR–48, Duolite A–30, Duolite A–41, Dowex 3, etc. are also usable. Porous resins such as Amberlite IRA–401 (Amberlite XE–75), Amberlite IRA–411 (Amberlite XE–98), Duolite A–40LC, Duolite A–42LC, have decoloring faculty and when they are used solely or together with other non-porous anion exchange resins, the major portion of pigment content in the extraction liquid can be removed simultaneously with organic acids. The amount of anion exchange resin used is varied depending on the nature of anion exchange resin used and the kind and quality of deoiled seeds to be extracted, but it is generally desirable to use more than 0.3 part of resin per 1 part of deoiled resin. The use of excess of resin does not cause any harmful effect.

The yield of protein according to the present invention is much higher than that of the conventional alkali extraction process. In the present invention, alkali or alkali salt solution is not used and instead only water is used for extraction, the alkali metal ion contained in the deoiled seeds being utilized. Consequently it is considered that the amount of metallic ion contained in the extraction liquid is small and it is possible to make the effect of dissolution of protein very little in the adjustment of the pH of the extraction liquid to the isoelectric point by adding acid and the centrifugal separation of coagulated protein, and this is the reason why the yield is high in the present invention. The results of comparison of the present invention with the conventional alkali extraction process regarding to the purity and loss of protein are set forth in the following table.

|  | Purity of separated protein (dry) | | Yield of protein from material | Rate of loss of protein |
| --- | --- | --- | --- | --- |
|  | Total nitrogen content (A) | Protein content (percent) A×6.25 | | |
| Product of present invention_____percent__ | 15–16 | 93.75–100 | 96.8–97.8 | 2.2–3.2 |
| Product of conventional alkali extraction process_____percent__ | 14–15 | 87.5–93.75 | 91–94 | 6–9 |

The present invention is characterized by the execution of three steps of extraction, refining and separation of organic acids simultaneously by utilization of the characteristic properties of anion exchange resins. This invention is applicable to all oil extracted seeds as well as oil extracted soybeans. The nature of oil extracted seeds may be varied somewhat depending on the difference of the method used for extraction of seeds, for example, whether it is extraction by compression or dissolution and also on the difference of temperature at which the solvent is separated in the extraction operation, in other words, whether it is high temperature treatment or low temperature treatment, but the present invention is applicable to all these oil extracted seeds. Some examples of the application will be described in the following with reference to the accompanying drawing in which:

*Example 1*

Figure 1:
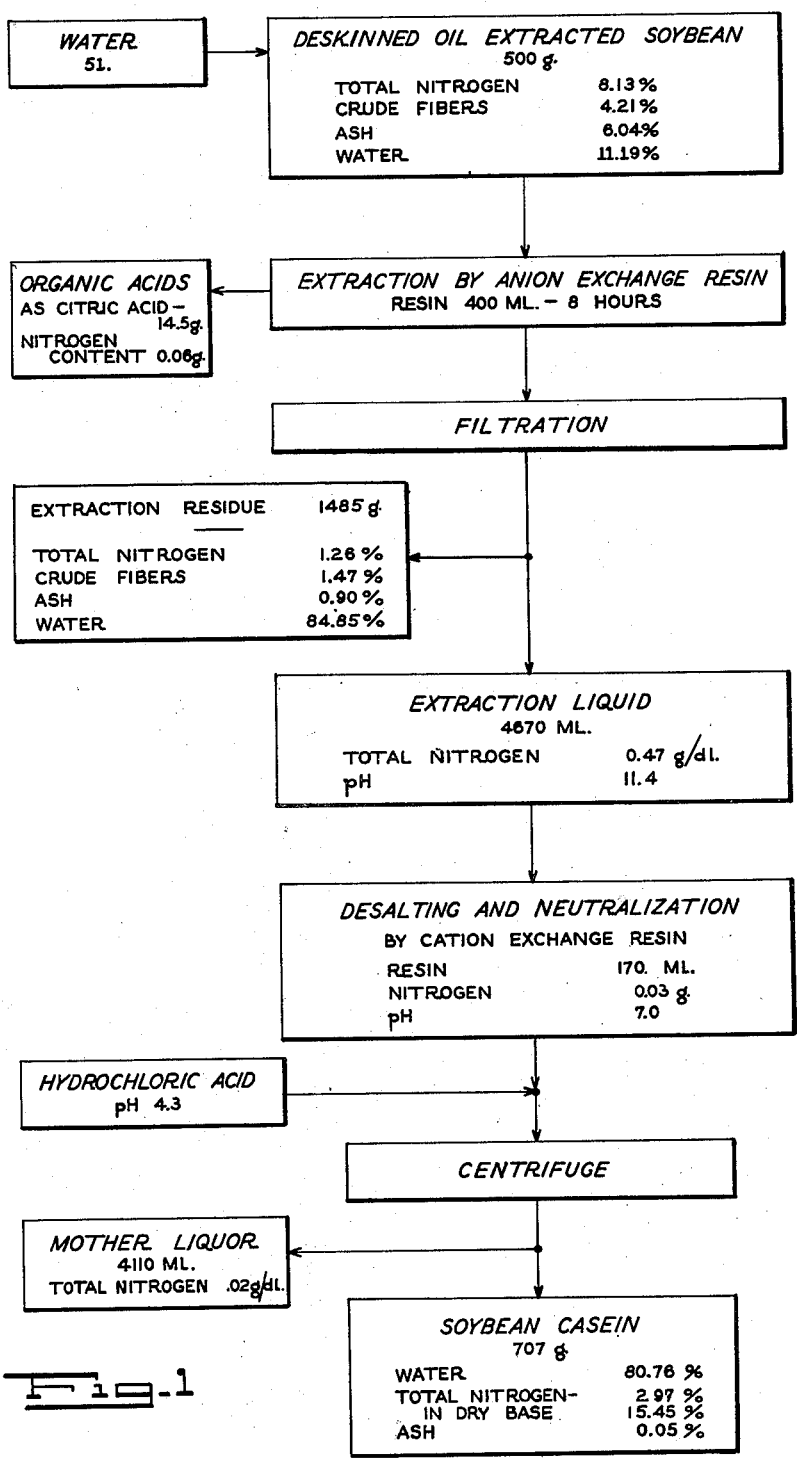
FIG. 1 is a flow diagram illustrating one of the examples of the invention.

(See FIG. 1)

Deskinned oil-extracted soybeans amounting to 500 g. (total nitrogen 8.13%, ash 6.04%, crude fibers 4.21%, water content 11.19%) is charged in an extraction vessel, which is connected through a pump to a column containing 400 ml. of strongly basic anion exchange resin, Amberlite IRA–410 (OH type). After adding 5 l. of distilled water, the pump is operated to circulate the liquid at the rate of 300 ml./min. The pH of the extraction liquid is rapidly raised and it reaches a constant value of 11.3 after about 4 hours. The nitrogen content in the extraction liquid is also rapidly increased and reaches a substantially constant value in 6–7 hours. After conducting the extraction for 8 hours, the extraction residue is filtered off. The resin is separately washed twice with a portion of 300 ml. of distilled water each, and the washing water is combined with the filtrate.

The amount of protein adsorbed by Amberlite IRA–410 during this operation is small (0.06 g. calculated as nitrogen) and it is substantially completely removed by washing with water. The extraction residue amounting to 1485 g. (total nitrogen 1.26%, crude fibers 1.47%, ash 0.90%, water 84.85%) is dried to obtain dried substance amounting to 225 g. and containing 8.32% nitrogen and 5.94% ash. The ash content is sufficiently low to make the substance usable as an industrial material.

The extraction liquid amounting to 4670 ml. (total nitrogen 0.47 g./dl., pH 11.4) is agitated with a bag of Saran filled with 170 ml. of Amberlite IR–120 (H type) to desalt and neutralize the liquid to pH 7, and thereafter hydrochloric acid is added to make the pH 4.3. By removing coagulated protein in a centrifuge, 707 g. of soybean casein (total nitrogen 2.97%, ash 0.05%, water 80.78%, total nitrogen in dry base 15.45%) and mother liquor amounting to 4110 ml. (total nitrogen 0.02 g./dl.) are obtained. The obtained soybean casein contains very little ash and is well refined. If the solution of protein neutralized to pH 7.0 is sprayed and dried, powdered protein can be obtained.

When the strongly basic anion exchange resin, Amberlite IRA–410, used for extraction and amounting to 400 ml. is washed with 500 ml. of 2 N caustic soda solution and then with water and the liquids used for washing are treated with strongly acidic cation exchange resin, Amberlite IR–120 (H type), to remove sodium ion, the liquids exhibit strongly acidic properties. It is confirmed that the main ingredient contained in this liquid is organic acid, particularly citric acid. The result of titration carried out to determine the organic acid shows that it is 14.5 g. calculated as citric acid.

The loss of nitrogen occurs mainly through three factors, that is by adsorption onto anion exchange resin at the time of extraction with said resin, adsorption onto cation exchange resin at the time of neutralization by said resin (0.03 g. as nitrogen) and dissolution into the mother liquor. However, the total of nitrogen loss is only 2.2% and this invention makes it possible to separate highly purified protein and organic acids (mainly citric acid) from deskinned oil extracted soybeans and to give extraction residue which is satisfactory for use as an industrial material.

*Example 2*

Figure 2:
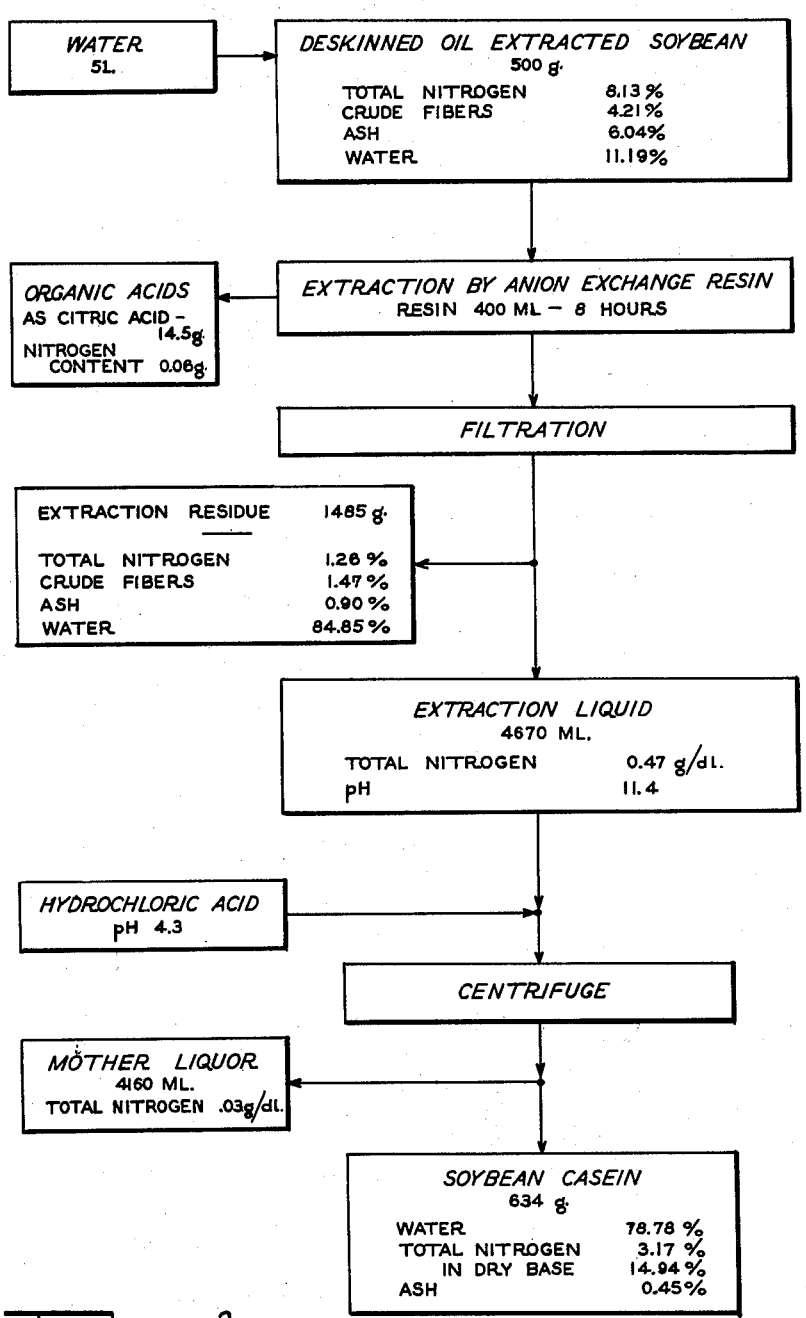
FIG. 2 is a flow diagram illustrating another of the examples.

(See FIG. 2)

500 g. of deskinned oil extracted soybeans (total nitrogen 8.13%, ash 6.04%, crude fibers 4.21%, water 11.19%) is charged in an extraction vessel and is connected through a pump to a column containing 400 ml. of Amberlite IRA–410 (OH type), strongly basic anion exchange resin. After adding 5 l. of distilled water, extraction is conducted for 8 hours by operating similarly to Example 1, and 1485 g. of extraction residue (total nitrogen 1.26%, crude fibers 1.47%, ash 0.90%, water 84.85%) and 4670 ml. of extraction liquid (total nitrogen 0.47 g./dl., pH 11.4) are separated from each other. The pH of the extraction liquid is adjusted to 4.3 by adding hydrochloric acid and coagulated protein is separated in a centrifuge to obtain 634 g. of soybean casein (total nitrogen 3.17%, ash 0.45%, water 78.78%, total nitrogen in dry base 14.94%) and 4160 of mother liquor (total nitrogen 0.03 g./dl.).

The soybean casein obtained contains slightly more ash than that of Example 1 but it is still of a well refined quality. With regard to the separation of organic acids and the properties of the extraction residue, they are the same as described in Example 1. The loss of nitrogen is caused from two factors, i.e., the adsorption onto anion exchange resin at the extraction by said resin (0.06 g. as nitrogen) and the dissolving out into the mother liquor, and the total loss of nitrogen is 3.2%.

What we claim is:

A process of separating and refining protein from oil extracted seeds comprising forming an extraction liquid constituted by water and an oil extracted seed, circulating a basic anion exchange resin in said liquid to raise the pH of the extraction liquid whereby the protein in the seeds is dissolved substantially free of the ash of the seeds, lowering the pH of the solution and removing the protein from the solution by forming a coagulate.

References Cited by the Examiner

UNITED STATES PATENTS

| | | | |
|---|---|---|---|
| 2,669,559 | 2/54 | Reid | 260—123.5 XR |
| 2,684,960 | 7/54 | Taylor | 260—123.5 |
| 2,881,159 | 4/59 | Circle et al. | 260—123.5 |
| 2,887,395 | 5/59 | Rowe | 260—123.5 XR |
| 3,049,530 | 8/62 | Rackis et al. | 260—123.5 |
| 3,099,649 | 7/63 | Kawamura et al. | 260—123.5 |

LEON J. BERCOVITZ, *Primary Examiner.*

C. B. PARKER, J. R. LIBERMAN, *Examiners.*